United States Patent
Gustafson et al.

[19]

[11] Patent Number: 6,074,139
[45] Date of Patent: Jun. 13, 2000

[54] PROCESS FOR BORING BOLT HOLES IN MATING COUPLING FLANGES

[75] Inventors: Thomas Gene Gustafson, Brooklyn Park, Minn.; Dennis John Werner, Dallas, Tex.

[73] Assignee: General Electric Co., Schenectady, N.Y.

[21] Appl. No.: 09/203,467

[22] Filed: Dec. 2, 1998

[51] Int. Cl.[7] .......................... B23B 35/00; B23B 39/00; B23B 3/22

[52] U.S. Cl. .......................... 408/1 R; 408/72 R; 82/128

[58] Field of Search .................. 408/1 R, 72 R, 408/72 B, 80, 81, 82; 82/128

[56] References Cited

U.S. PATENT DOCUMENTS

| | | | |
|---|---|---|---|
| 12,078 | 12/1854 | Taft | 408/72 R |
| 349,963 | 9/1886 | Watson et al. | 408/81 |
| 1,154,035 | 9/1915 | Locke | 408/1 R |
| 1,432,459 | 10/1922 | Griffin | 408/72 R |
| 1,916,414 | 7/1933 | Chapman | 408/72 R |
| 2,140,854 | 12/1938 | Schnebly | 408/72 R |
| 2,209,433 | 7/1940 | Ulrich | 408/72 R |
| 2,404,456 | 7/1946 | Pierce | 408/72 R |
| 2,417,539 | 3/1947 | Aronson | 408/72 R |
| 3,158,045 | 11/1964 | Siler | 408/1 R |
| 3,436,155 | 4/1969 | Perin, Jr. | 408/1 R |
| 3,851,990 | 12/1974 | West | 408/72 R |
| 3,884,593 | 5/1975 | Christoffer | 408/80 |
| 4,294,567 | 10/1981 | Wiggins | 408/72 R |
| 4,314,491 | 2/1982 | Hartmann et al. | 82/4 R |
| 4,463,633 | 8/1984 | Grimsley | 82/4 R |
| 4,538,354 | 9/1985 | Smolik | 408/72 B |
| 4,594,030 | 6/1986 | Weigel, Jr. | 408/10 |
| 4,601,618 | 7/1986 | McEldowney | 408/1 R |
| 4,668,133 | 5/1987 | Campbell et al. | 408/81 |
| 4,770,074 | 9/1988 | Kwech | 82/4 R |
| 4,850,756 | 7/1989 | Dubois | 408/72 R |
| 4,990,037 | 2/1991 | Strait | 408/72 R |
| 5,143,489 | 9/1992 | Bogner et al. | 408/1 R |
| 5,161,923 | 11/1992 | Reccius | 408/72 R |
| 5,171,110 | 12/1992 | Pettifer et al. | 408/1 R |
| 5,318,394 | 6/1994 | Pierce et al. | 408/72 B |
| 5,439,329 | 8/1995 | Marron | 408/1 R |
| 5,462,392 | 10/1995 | Hardwick | 408/76 |
| 5,746,551 | 5/1998 | Skaggs | 408/80 |

OTHER PUBLICATIONS

Millwrights and Mechanics Guide, 4th ed. New York, MacMillan Publishing Company, 1989, pp. 422–426.

*Primary Examiner*—Andrea L. Pitts
*Assistant Examiner*—Erica D. Ergenbright
*Attorney, Agent, or Firm*—Nixon & Vanderhye

[57] ABSTRACT

A method of boring a plurality of aligned, mating bolt holes in a pair of separated coupling flanges comprising the steps of:

a) providing a template with pre-formed holes matching a desired location for bolt holes in the pair of coupling flanges;

b) securing the template to a first of the pair of coupling flanges;

c) attaching a boring tool to the template in alignment with one of the bolt holes;

d) re-boring one of the bolt holes in the first coupling flange and repeating steps c) and d) for each remaining bolt hole individually in succession;

e) removing the boring tool and template from the first coupling flange;

f) relocating the template on the second of the pair of coupling flanges; and g) repeating steps b) through e) for the bolt holes in the second coupling flange.

7 Claims, 4 Drawing Sheets

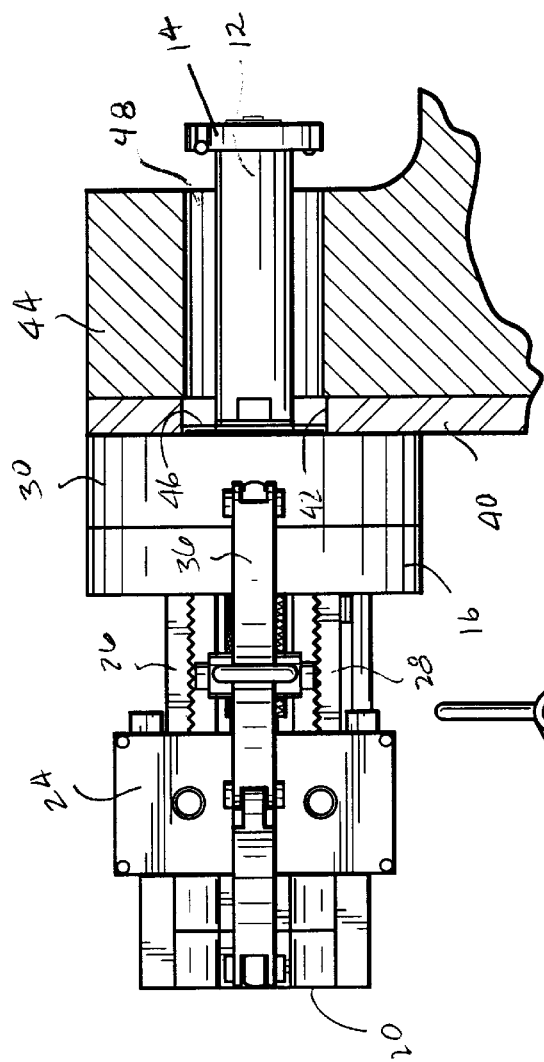
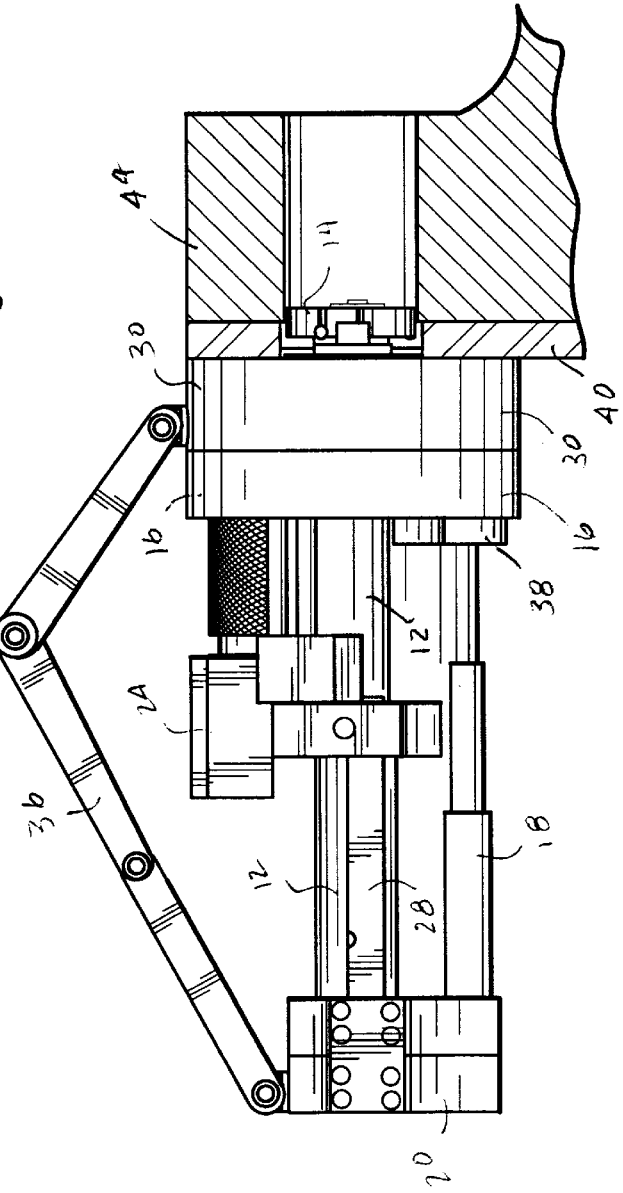
Fig.3
Fig.4

PROCESS FOR BORING BOLT HOLES IN MATING COUPLING FLANGES

BACKGROUND OF THE INVENTION

This invention relates to the boring of bolt holes in mating coupling flanges, with particular applicability to the coupling flanges of turbomachinery.

Presently, the line boring of turbine coupling bolt holes take place after a rotor is replaced, or when new coupling bolts are being installed. With rotor replacement, at least one of the coupling halves is new to the coupling assembly, requiring re-boring of the existing bolt holes to the tight tolerances required. The coupling halves are aligned, and joined together while the coupling bolt holes are bored through both coupling flanges simultaneously. In the case of gas and/or steam turbines, the process is carried out during the critical path of the turbine outage.

BRIEF SUMMARY OF THE INVENTION

The process in accordance with this invention relates to the precision boring of the bolt holes in mating flanges of a turbine coupling without having to first join the coupling halves. More specifically, each half of the coupling, i.e., each coupling flange, is bored separately, prior to the joining of the flanges of the coupling halves.

The process utilizes a precision boring tool mounted to a relatively rigid template which accurately locates and sizes the holes prior to assembly of the coupling halves. More specifically, the template is premachined with holes matching the desired location of the bolt holes on the coupling flanges to be joined, using currently available CNC machines.

The template is subsequently aligned on the face of one of the coupling flanges, such that the template is concentric with the center axis of the coupling and with the outside diameter of the flange, and, of course, circumferentially aligned to the existing bolt holes. The template is fixed to the coupling flange, using some of the existing bolt holes. The boring tool is mounted on the template, utilizing plural electromagnets on the face of the tool. The tool is then actuated to re-bore the bolt hole, and this process is carried out repeatedly and sequentially for each of the available bolt holes. The tool is then removed, and the bolts holding the template to the coupling flange are relocated to already re-bored bolt holes. The tool is then employed to re-bore the remaining bolt holes on the flange.

After all of the bolt holes on one of the coupling flanges have been re1 bored, the tool and the template are removed. The template is moved, without reorientation, to the other of the two coupling flanges and the process repeated.

Because the template has been pre-machined with a reference diameter based on the outside diameter of the coupling flanges, and on the radial distance between the above outside diameters and the center axis of the coupling halves, precision alignment of the bolt holes is assured even though the coupling flanges are not joined together for the re-boring process.

Accordingly, in its broader aspects, the present invention relates to a method of boring a plurality of aligned, mating bolt holes in a pair of separated coupling flanges comprising the steps of:

a) providing a template with pre-formed holes matching a desired location for bolt holes in the pair of coupling flanges;

b) securing the template plate to a first of the pair of coupling flanges;

c) attaching a boring tool to the template in alignment with one of the bolt holes;

d) re-boring said one of the bolt holes in the first coupling flange and repeating steps c) and d) for each remaining bolt hole individually in succession;

e) removing the boring tool and template from the first coupling flange;

f) relocating the template plate on the second of the pair of coupling flanges; and g) repeating steps b) through e) for the bolt holes in the second coupling flange.

BRIEF DESCRIPTION OF THE DRAWINGS

FIG. 3 is a partial plan view, partially sectioned, of the tool of FIGS. 1 and 2, mounted on a coupling flange with the tool head extended, prior to boring;

FIG. 4 is a partial side elevation, partially sectioned, of the tool as mounted in FIG. 3, but with the tool head retracted, after boring.

DETAILED DESCRIPTION OF THE INVENTION

Figure 1:
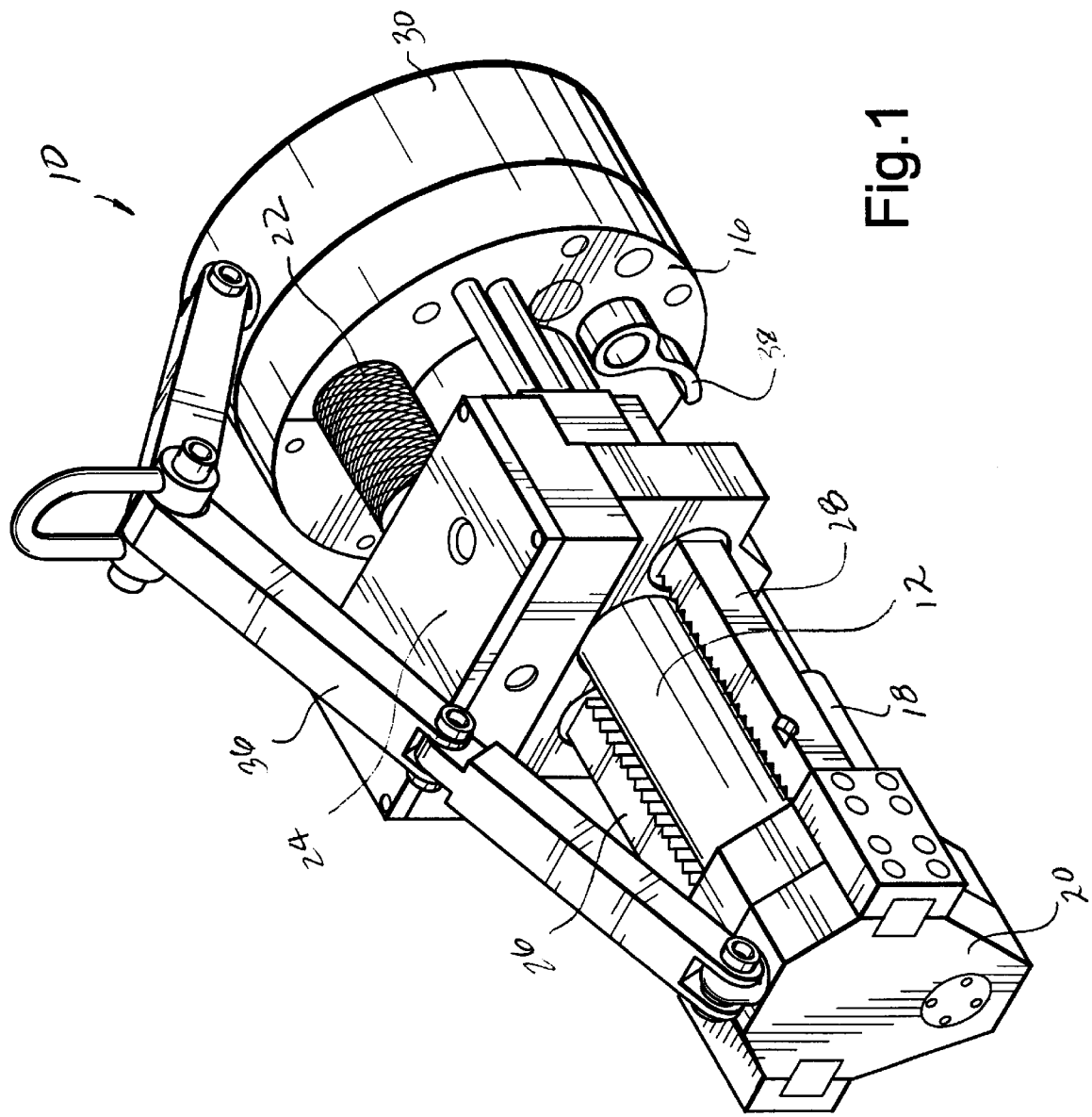
FIG. 1 is a rear perspective view of a boring tool which may be employed in the process of this invention.
Figure 2:
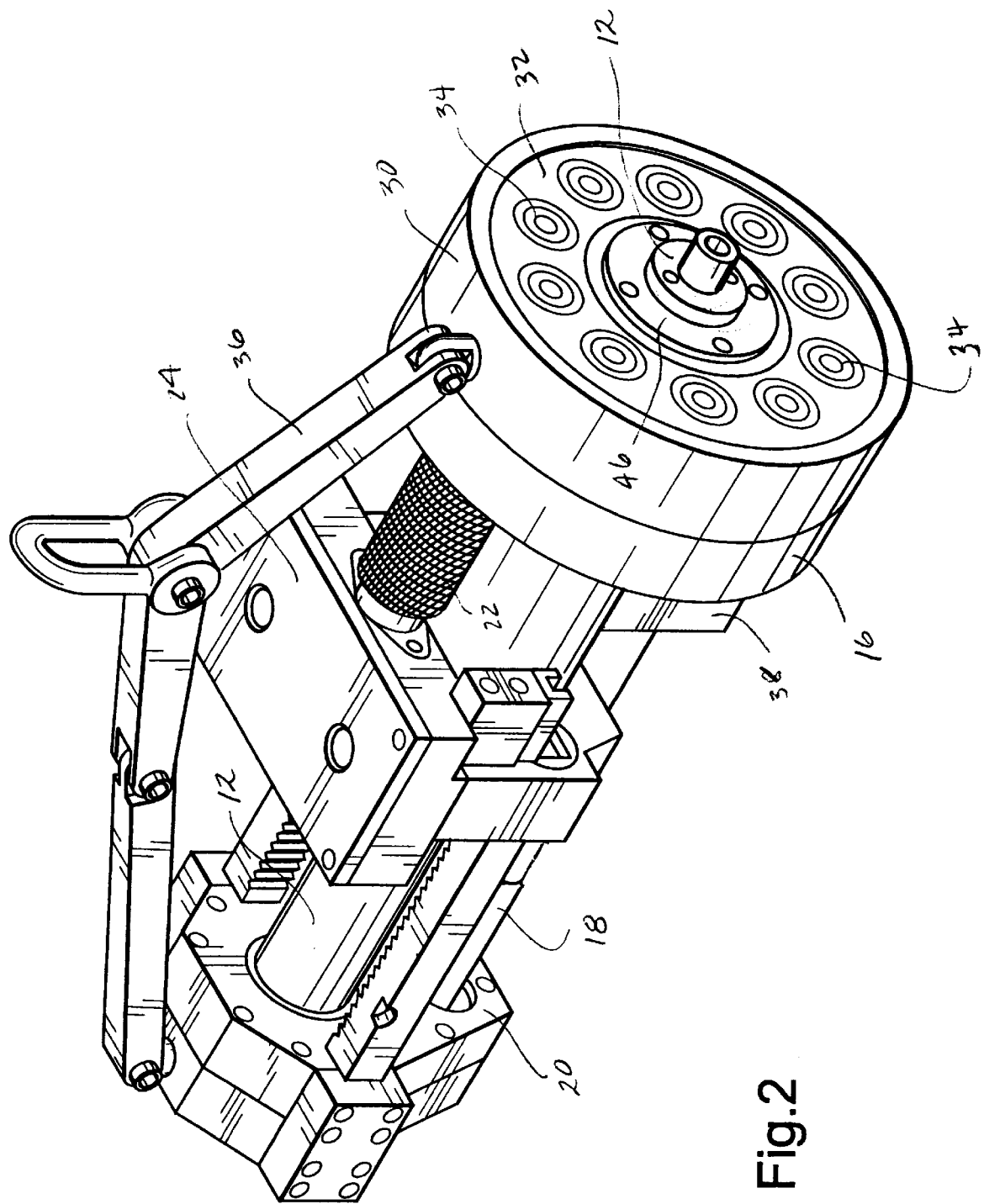
FIG. 2 is a front perspective view of the tool shown in FIG. 1.

The boring tool 10 includes a rotatable boring bar or shaft 12 which can be fitted with either a smooth or rough finishing head 14 (FIG. 3) depending on situational requirements. The tool head 14 is adapted to be mounted on the free end of the shaft 12. The shaft 14 is rotated by a spindle air motor (e.g., a 1.45 HP motor) 16 through a telescoping drive shaft 18 and gear box 20. The shaft 12 and gear box 20 are axially movable in opposite directions by means of a feed air motor 22 (e.g., a 0.2 HP motor) and axial feed gear box 24 which controls relative reciprocating movement of the shaft 12 and gear box 20 by means of gear racks 26, 28 which are fixed to the gear box 20 (which is fixed to the shaft 12) and which pass through the axial feed gear box 24 where they are driven in either of two opposite directions. The axial feed gear box 24 is mounted in fixed relationship to the spindle air motor 16, and the latter is mounted to a disk-like face plate 30.

The face plate 30 is used to mount the tool to a relatively rigid metal template, as described below, by electromagnetic force. In this regard, the forward surface 32 of the face plate 30 is provided with eight electromagnets 34 (the exact number may vary), with suitable power source (not shown) controlled by an on-off switch (also not shown), all of which are of conventional construction. A lifting bracket 36 is provided to facilitate movement of the tool as described below.

The tool 10 is designed so that the boring operation is carried out as the tool head 14 is drawn back toward the tool face plate 30, as opposed to the more typical "push forward" motion. The speed and direction of movement of the tool head 14 is controlled by the feed motor 22 and related controls, while rotation of the shaft 12 is controlled by adjustment lever 38.

The process of boring bolt holes in mating coupling flanges will now be explained with continuing reference to FIGS. 3–5. In the event of, for example, a rotor replacement, turbine coupling halves must be rejoined but at least one of the coupling flanges is new, i.e., not part of the previous coupling joint. Because of the criticality of the coupling flange alignment, the bolt holes of both coupling flanges must be re-bored as described below, with considerable precision to insure the required rotor alignment.

First, the relatively rigid template 40 is provided with holes 42 precisely located about the template in a circular array, and sized by CNC machining. In other words, the template holes are sized and spaced to the required specifications for the bolt holes on the respective coupling flanges. The template 40 is then aligned and secured to the face of one of the coupling flanges 44, using about ¼ of the existing bolt holes. In this regard, coupling flanges can have between 12 and 40 bolt holes, and hence the template 40 would be held in place using somewhere between about 3 and about 10 of the existing bolt holes. The template 40 is aligned both with the existing bolt holes and with the peripheral surface (outside diameter) of the coupling flange 44 which is a fixed radial distance from the center axis of the coupling. By so aligning the template 40, accuracy is assured for the boring of bolt holes in both coupling flanges.

The boring tool 10 is then mounted on the template 40 at a first bolt hole by actuating the electromagnets 34. Note here that the forward surface 32 of the plate 30 is formed with a round projecting surface 46 which seats within the hole 42 in the template 40 (FIG. 3), in the manner of a rabbet joint, assuring precise alignment of the tool. With the tool 10 in place and shaft 12 extended through the bolt hole 48 in flange 44, the roughing or finishing tool head 14 is secured to the shaft 12, on the opposite side of the coupling flange, in the position shown in FIG. 3.

The drive motors 16 and 22 are actuated to pull the rotating boring head 14 through the bolt hole 48, toward the face plate 30, re-boring the bolt hole to its new diameter specifications, with the gear box 20 and gear racks 26, 28 moving rearwardly to the position shown in FIG. 3. Note that during the boring operation, the drive shaft 18 extends in telescoping fashion, best seen in that same Figure.

With this first hole re-bored, the electromagnets 34 are released, and the tool 10 removed from the template 40, and the process is repeated for each of the remaining accessible bolt holes in the flange coupling 44. After all of the accessible holes are re-bored, the template securing bolts are removed and relocated to already re-bored holes. The re-boring process is then repeated for each of these remaining bolt holes, to complete the re-boring of the bolt holes in one of the coupling flanges.

Figure 5:
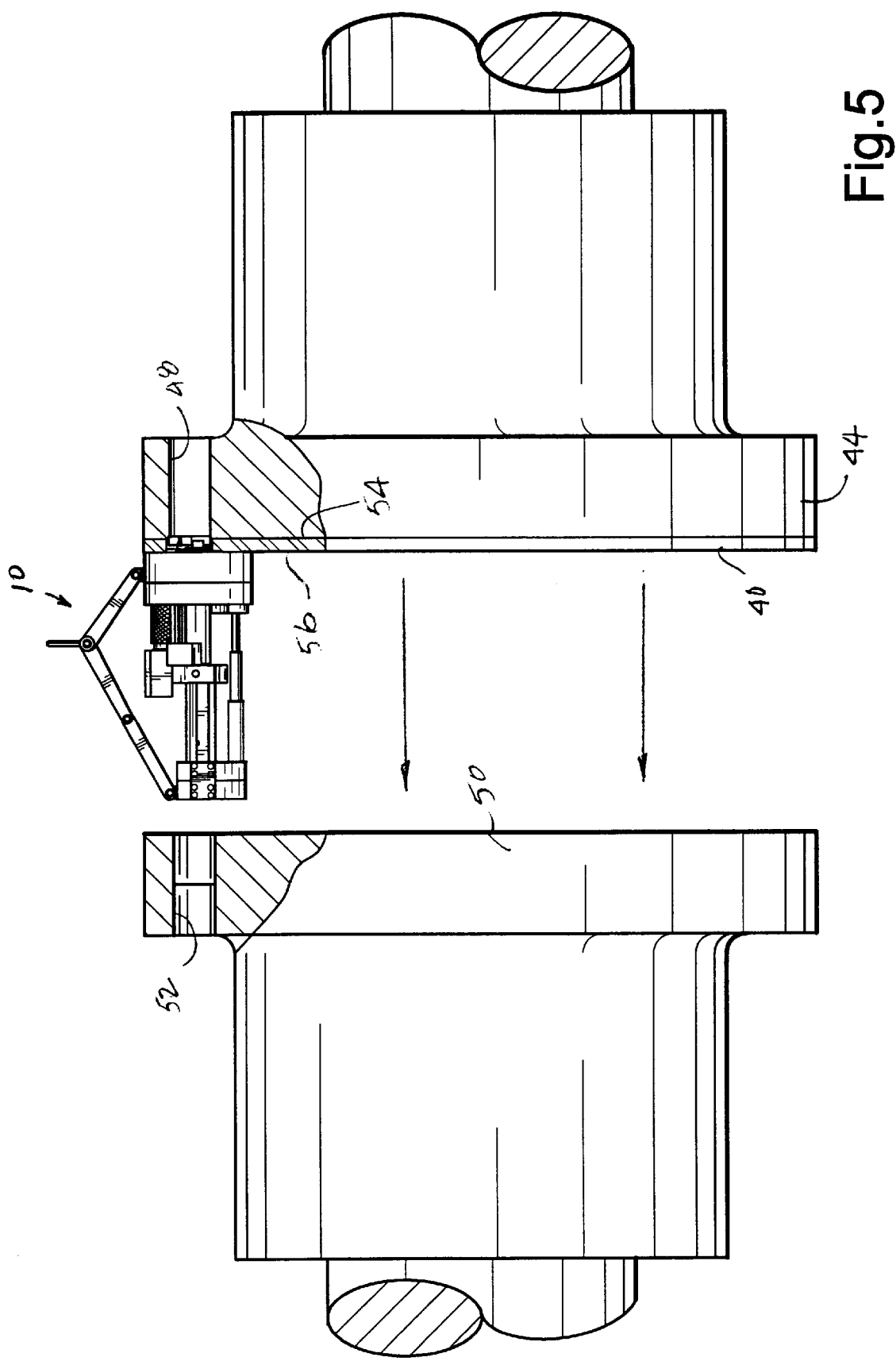
FIG. 5 is a partial side elevation, partially sectioned, showing the tool of FIGS. 1 and 2 mounted on one of a pair of adjacent but separated coupling halves.

The tool 10 is then removed again from the template 40 and, with reference to FIG. 5, the template 40 is also removed from coupling flange 44 and attached to the opposite coupling flange 50, without reorienting the template 40. In other words, as viewed in FIG. 4, the template 40 is simply moved to the opposite coupling flange 50 (as indicated by the arrows in FIG. 5), without reversing the template, and with no circumferential movement. In other words, one face 54 of the template 40 is engaged with the first coupling flange 44, while the opposite face 56 of the template is engaged with the second coupling flange 50. This assures mirror image re-boring of matched holes 52 on the opposed coupling flange 50. The process is then repeated for each of the bolt holes on the coupling flange 50, in the same manner as described above with respect to coupling flange 44.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of boring a plurality of aligned, mating pre-formed bolt holes in a pair of separated coupling flanges comprising the steps of:

a) providing a template with pre-formed holes matching a desired location for bolt holes in the pair of coupling flanges;

b) securing the template to a first of the pair of coupling flanges;

c) attaching a boring tool to the template in alignment with one of the bolt holes;

d) re-boring said one of the bolt holes in the first coupling flange and repeating steps c) and d) for each remaining bolt hole individually in succession;

e) removing the boring tool and template from the first coupling flange;

f) relocating the template on the second of the pair of coupling flanges; and g) repeating steps b) through e) for the bolt holes in the second coupling flange.

2. The method of claim 1 wherein step b) is carried out by aligning the template with a peripheral surface of the first coupling flange.

3. The method of claim 1 wherein step b) is further carried out using a fraction of said bolt holes in said first coupling flange.

4. The method of claim 2 wherein the outside diameter of the second coupling flange is substantially identical to the outside diameter of the first coupling flange.

5. The method of claim 1 wherein step b) is carried out using mounting bolts extending through a fraction of said plurality of bolt holes, and wherein said mounting bolts are relocated to re-bored bolt holes to permit re-boring of said fraction of said bolt holes.

6. The method of claim 1 wherein in step b), one face of said template engages said first of the pair of coupling flanges and, in step f), an opposite face of said template engages said second of said pair of coupling flanges.

7. The method of claim 6 wherein said template is maintained in the same circumferential orientation in steps b) and f).

* * * * *